United States Patent [19]

Gilchrist et al.

[11] Patent Number: 5,132,900
[45] Date of Patent: Jul. 21, 1992

[54] METHOD AND APPARATUS FOR LIMITING MANIPULATION OF DOCUMENTS WITHIN A MULTI-DOCUMENT RELATIONSHIP IN A DATA PROCESSING SYSTEM

[75] Inventors: Frank W. Gilchrist, Coppell; Marvin L. Williams, Lewisville, both of Tex.

[73] Assignee: International Business Machines Corporation, Armonk, N.Y.

[21] Appl. No.: 633,880

[22] Filed: Dec. 26, 1990

[51] Int. Cl.$^5$ ............................................. G06F 15/38
[52] U.S. Cl. ................................................. 364/419
[58] Field of Search ................ 364/419, 900 MS File, 364/200 MS File

[56] References Cited

U.S. PATENT DOCUMENTS

4,815,030 3/1989 Cross et al. .......................... 364/900
4,959,769 9/1990 Cooper et al. ....................... 364/200

Primary Examiner—Dale M. Shaw
Assistant Examiner—Xuong M. Chung
Attorney, Agent, or Firm—Andrew J. Dillon

[57] ABSTRACT

A method and apparatus for limiting manipulation of individual documents within a multi-document relationship in accordance with a plurality of user specified preferences. A user preference object is created and utilized to store a plurality of user specified preferences for selected documents or for all documents which contain a selected attribute. Thereafter, any attempted manipulation, such as transmission, copying or deleting, of a document within the multi-document relationship will be limited in accordance with the stored preferences within the user preference object. In this manner, a distribution service may relay and distribute a selected document which might not normally be distributed due to incompatible characteristics of other documents which exist in a relationship with the selected document.

7 Claims, 5 Drawing Sheets

METHOD AND APPARATUS FOR LIMITING MANIPULATION OF DOCUMENTS WITHIN A MULTI-DOCUMENT RELATIONSHIP IN A DATA PROCESSING SYSTEM

CROSS-REFERENCE TO RELATED APPLICATION

The present application is related to U.S. patent application Ser. No. 07/454,797, entitled "VECTOR RELATIONAL CHARACTERISTICAL OBJECT," filed Dec. 19, 1989, by one of the inventors herein named, assigned to assignee of the present application and incorporated herein by reference thereto.

BACKGROUND OF THE INVENTION

1. Technical Field

The present invention relates in general to improved data processing systems and in particular to an improved method and apparatus for manipulating documents which exist in a multi-document relationship. Still more particularly, the present invention relates to a method and apparatus for limiting manipulation of documents which exist in a multi-document relationship in accordance with a plurality of user selected preferences.

2. Description of the Related Art

The modern electronic office has resulted in the grouping of electronic documents into relationships which are intended to aid in electronically storing, searching and retrieving of such documents. The utilization of document libraries represents one technique for meeting this need of the modern electronic office. As currently implemented, document libraries offer functions analogous to manual filing and retrieving of paper documents, but in a far less cumbersome manner. One prior art structure which meets the need for electronically storing, searching and retrieving documents is the Document Interchange Architecture (DIA) which is part of an office system marketed by the International Business Machines Corporation. The Document Interchange Architecture (DIA) document structure provides a set of descriptors for each document filed in a library. These descriptors are placed in document profiles and are filed with the documents. The document profiles preferably contain parameters which identify the content of the document, such as the name under which it is filed, the authors, the subject of the document and the date the document was filed in the document library.

These document profiles may be used for searching for documents in a library. For example, a user may specify a search requesting all documents about a particular subject, by a selected author, or that were received by the library between two selected dates. Upon completing the search, a user would be given a list of all documents which met the criteria utilized by the search. A user or end user, as specified herein, may be a person, device, program or computer system which utilizes the library for data processing and information exchange. Further, the term "document" shall mean any collection of data which may be processed or manipulated.

In addition to receiving documents based on specific search criteria, the DIA document library service provides for the formation of relationships between documents. One example of such a multi-document relationship is the concept of folder documents. A folder document is created when a user groups documents together into a linear or hierarchical structure. Documents assume a linear structure when they are organized by placing a set of documents in a user specified position within a particular folder. Document may assume a hierarchical structure by nesting documents that are folders, or more simply, by putting a document that is itself a folder into another document that is a folder.

Each document in a folder, regardless of its relationship with other documents, has separate document definitions including descriptors, access control and document content information. Therefore, access to one document contained within a particular relationship implies nothing with respect to access to other documents within that same multi-document relationship. All documents in a DIA document library have a Library Model Object (LMO) called the Document Relation Object (DRO), associated with those documents which describes the document relationships. Therefore, when there is a need to access a folder, each Document Relation Object for each document in a folder must be accessed to determine the complete relationship between documents.

Another example of a multi-document relationship which is permitted in the DIA library structure is the staple relationship. A staple relationship allows a user to attach two documents together. Staple relationships provide a tightly bound, directed, one-to-one document relationship between documents. In addition, stapled documents may be placed within a folder document. The Document Relation Object for each of the documents as previously described for folder documents, must describe the relationship between the staple documents as well as the relationship between the folder documents. Thus, each document within a multi-document relationship contains its own particular attributes such as language, document type, character sets, and other profile information which describes the characteristics of the document itself. For example, if all documents in a multi-document relationship were composed in French, each document would have profile information specifying that the document was in French.

Mechanisms which exist in the prior art treat a multi-document relationship as a single entity and any user assigned preference which may be applied to the multi-document relationship is assigned to the relationship document as a whole. Thus, the prior art does not permit individual documents within a multi-document relationship to be manipulated (i.e., transmitted, copied, or purged) in accordance with user selected preferences which are applicable to that document alone. Therefore, it should be apparent that a need exists for a method and apparatus which permits individual documents within a multi-document relationship to be manipulated in a manner which is limited by user specified preferences for each individual document.

SUMMARY OF THE INVENTION

It is therefore one object of the present invention to provide an improved data processing system.

It is another object of the present invention to provide an improved method and apparatus for manipulating documents which exist in a multi-document relationship in a data processing system.

It is yet another object of the present invention to provide an improved method and apparatus for limiting manipulation of documents which exist in a multi-document relationship in accordance with a plurality of user selected preferences.

The foregoing objects are achieved as is now described. The method and apparatus of the present invention may be utilized to limit manipulation of individual documents within a multi-document relationship in accordance with a plurality of user specified preferences. A User Preference Object is created and utilized to store a plurality of user specified preferences for selected documents or for all documents which contain a selected attribute. Thereafter, any attempted manipulation, such as transmission, copying or detecting, of a document within the multi-document relationship will be limited in accordance with the stored preferences within the User Preference Object. In this manner, a distribution service may relay and distribute a selected document which might not normally be distributed due to incompatible characteristics of other documents which exist in a relationship with the selected document.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
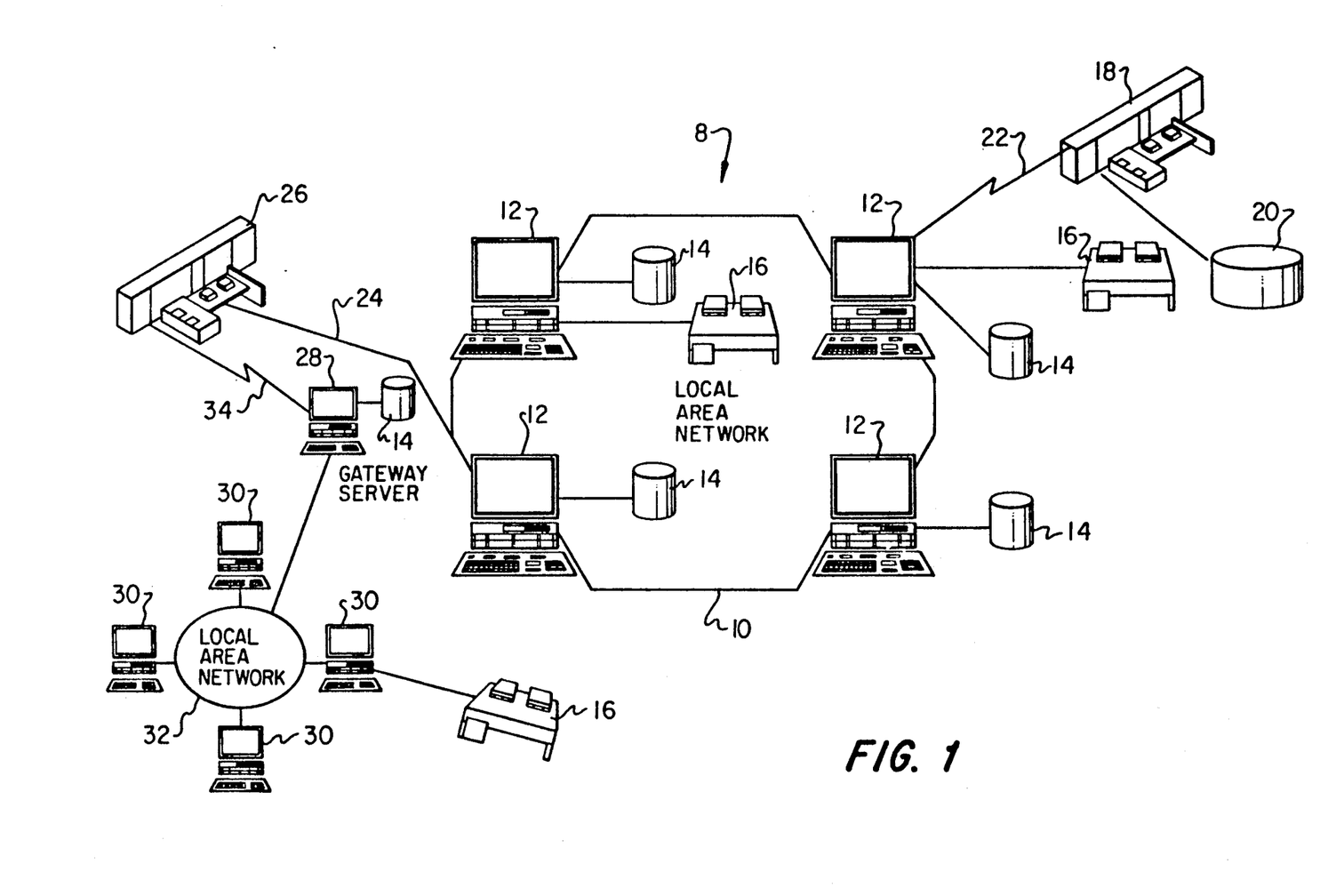
FIG. 1 a pictorial representation of a distributed data processing system which may be utilized to implement the method and apparatus of the present invention.

With reference now to the figures and in particular with the reference to FIG. 1, there is depicted a pictorial representation of a distributed data processing system 8 which may be utilized to implement the method and apparatus of the present invention. As may be seen, distributed data processing system 8 may include a plurality of networks, such as Local Areas Networks (LAN) 10 and 32, each of which preferably includes a plurality of individual computers 12 and 32, respectively. Of course, those skilled in the art will appreciate that a plurality of Intelligent Work Stations (IWS) coupled to a host processor may be utilized for each such network.

As is common in such distributed data processing systems, each individual computer may be coupled to a storage device 14 and/or a printer/output device 16. One or more such storage devices 14 may be utilized, in accordance with the method and apparatus of the present invention, to store the various documents which may be periodically manipulated by a user within distributed data processing system 8, in accordance with the method and apparatus of the present invention. By manipulated, what is meant is the distribution, transmittal, copying, purging or any other operation which may be applied to a selected document. In a manner well known in the prior art, each document stored within distributed data processing system 8 may be stored within a storage device 14 which is associated with a computer or work station.

Still referring to FIG. 1, it may be seen that distributed data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may server as remote storage for Local Area Network (LAN) 10 and may be coupled via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects, databases or documents may be stored within storage device 20 and controlled by mainframe computer 18, as resource manager or library service for the data objects and documents thus stored. Of course, those skilled in the art will appreciate that mainframe computer 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located within Texas and mainframe computer 18 may be located in New York.

As will be appreciated upon reference to the foregoing, it is often desirable for users within one portion of distributed data processing network 8 to access a database to obtain a document or multi-document relationship in an attempt to distribute that document or group of documents to another portion of distributed data processing network 8. Prior art mechanisms for distributing a multi-document relationship do so by treating a relationship document as a single entity and distributing that document in accordance with a user assigned preference which is currently assigned to the multi-document relationship as a whole. Thus, if a user has specified that conversion is prohibited for a multi-document relationship, the prior art assigns this user preference to the entire content of the multi-document relationship which is being distributed without consideration of the fact that many documents within the multi-document relationship may be freely converted. Thus, it should be apparent that a method and apparatus are required which permits a user to assign preferences to individual documents within a plurality of documents stored as a multi-document relationship.

Figure 2:
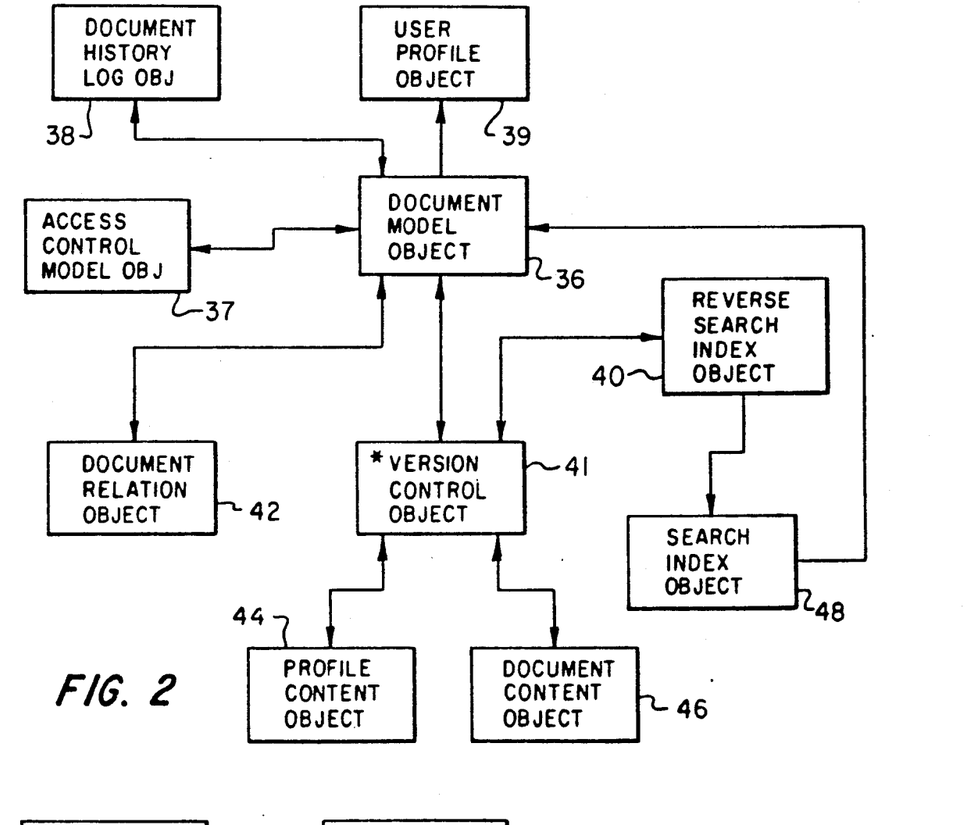
FIG. 2 a basic document model created for each document filed within a library within the distributed data processing system of FIG. 1.

Referring now to FIG. 2, a basic document model is shown for a document which is stored within any storage device within distributed data processing network 8. This document model is created by a Library Server or resource manager and is stored with each document and may be utilized for individual documents or for multi-document relationships. While it is not necessary to implement the basic document model explicitly to support Document Interchange Architecture (DIA) library service architecture, there is a requirement that a design be mapped to these models, or a subset of these models.

The Document Model Object (DMO) 36 is the heart of the DIA document model and is logically the first object created when a document is filed for the first time in a document library. It contains information concerning ownership and attributes for a particular document. More specifically, it contains document instance attributes, such as whether the document is editable or non-editable; the maximum number of versions; and the action to be taken if the user has attempted to edit a document that cannot be edited. In addition, Document Model Object (DMO) 36 may contain any of the following information:

(1) Document level locking information indicating the user who has checked a document out of the library for updating;
(2) Indications that documents' contents have been removed from direct control of the Library Server;
(3) Directions to a library administrator to remove parts or restore parts of a document to library service control;
(4) The time and date the information was removed from direct control of the Library Server;
(5) The location of information removed from direct control of the Library Server; and
(6) Optional information for archival purposes.

The Access Control Model Object 37 (ACMO) is created when a document is filed for the first time in a DIA library. The principle purpose of the Access Control Model Object 37 is to consolidate information to be used in determining non-owner access to a document. Access Control Model Object 37 contains access control information such as whether the document is capable of being accessed to anyone (public) whether access is permitted to a limited number of explicitly specified users (private), or whether the information is shared with others. Access Control Model Object 37 also contains information that governs the retention and disposal of the document.

Document History Log Object (DHLO) 38 is optionally created when a document is filed in the library and the user wishes to record various activities on the document. For example, a user may wish to record the number of times the documents was read and by whom.

User Profile Object 39 is not part of the DIA document model, but is instead an object referred to by the DIA document model. User Profile Object 39 is created when the users represented are logged members of an Office System Network. User Profile Object 36 identifies a user and contains information about the user such as aliases, services authorized to the user, default accounting information, and other user-specific information.

Document Relation Object 42 is created when a document is first filed in the library. Its purpose is to describe the logical relationships between a document and other related or group documents. For example, the DIA architecture allows folder documents to be created which contain other documents. When such a relationship exists, each document contained within a folder has a pointer entry called a Library Assigned Document Name (LADN) in Document Relation Object 42.

Version Control Object (VCO) 410 is created when a document is first filed into the library and contains information for several objects which may comprise a single named version of a document. Version Control Object (VCO) 41 also provides space for version naming, version level locks, and other version related level process control.

Profile Content Object (PCO) 44 is created when a document is first filed into the library and the user wishes to create sub-objects for performance or other reasons. Profile Content Object (PCO) 44 is the repository for profile information related to the sub-objects.

Documents Content Object (DCO) 46 is created when a document if first filed into the library and provides storage for the document contents. In addition, Document Content Object (DCO) 46 provides storage for saving information concerning the actual size of the document in various units of measurement.

Search Index Object (SIO) 48 contains those entries which are utilized in searching within a document. The entries are placed in the Search Index Object (SIO) 48 as a result of the following sequence of actions on the other objects. The basic Document Model Object 36 is first created as part of processing a FILE command. The Library Server then scan Profile Content Object 44, the Document Relation Object 42, and the Access Control Model Object (ACMO) 37 to find terms to be used to support a parametric SEARCH. As each search term is identified, an entry is made in the Search Index Object (SIO) 48 who's name includes the parametric search term value and semantics. If no Search Index Object (SIO) 48 exist when the Library Server scans aforementioned objects, one is created and the entries placed therein as if Search Index Object (SIO) 48 always existed.

Reverse Search Index Object (RSIO) 40 exists to support the removal of Search Index Object (SIO) 48 entries when a document is removed from the library by a DELETE command. Entries for parametric search terms are placed in Reverse Search Index Object (RSIO) 40 at the same time such entries are being made into Search Index Object (SIO) 48.

Figures 3, 4:
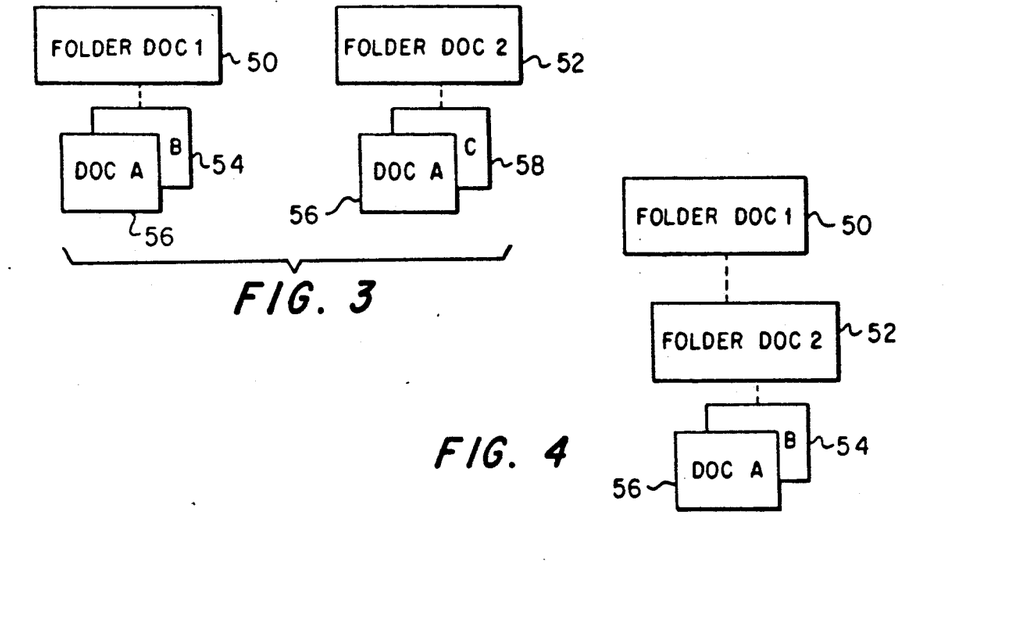
FIG. 3 a block diagram illustrating a multi-document relationship illustrating the concept of folder documents.
FIG. 4 a block diagram illustrating a folder relationship showing a folder nested with in a second folder.

With reference now to FIG. 3, a block diagram illustrating a multi-document relationship illustrating a multi-document relationship depicting the concept of folder document is illustrated. Document A 56 and document B 54 represent individual items contained in folder document 1 50. Document A 56 is also contained in folder document 2 52 along with document C 58. Folder document 1 50 and folder document 2 52 might be individual personnel jackets and documents A 56 might be a document explaining a personnal policy. Only one actual copy of document A 56 is needed and that copy is always consistent across personnel jackets. The relationship between the documents and the folders are contained in the Document Relation Object (DRO). Access to the document in each folder requires the Library Server access the Document Relation Object of each document to determine the relationship.

Turning to FIG. 4, expansion of the document in a folder concept is shown to include a folder in a folder. Document A 56 and document B 54 are items in folder 2 52. Folder document 2 52 is then placed into folder document 1 50. For example, folder document 1 50 may be a corporate opinion survey report while document 2 52 may be the Austin survey report. Document A 56 and document b 54 may be survey reports from two different areas in Austin. Again, each time the Library Server accesses the documents shown in this relationship, the Document Relation Object for each of the items must be examined.

Figure 5:
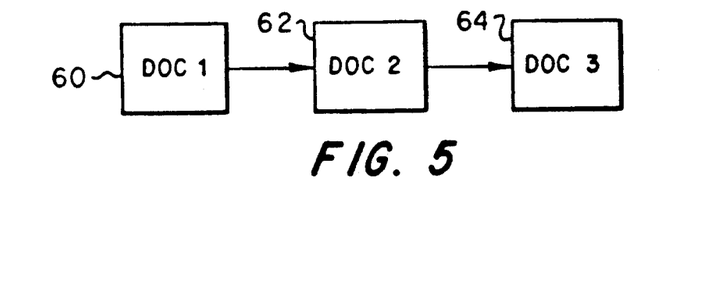
FIG. 5 a block diagram illustrating a multi-document relationship illustrating the concept of a staple relationship.

Referring to FIG. 5, another document relationship is shown where one document is stapled to another. Document 1 60 is stapled to document 2 62 which is stapled to document 3 64. The staple relationship allows the user to attach two documents together. The Document Relation Object (DRO) for each document contains the current state of the relationship.

Figure 6:
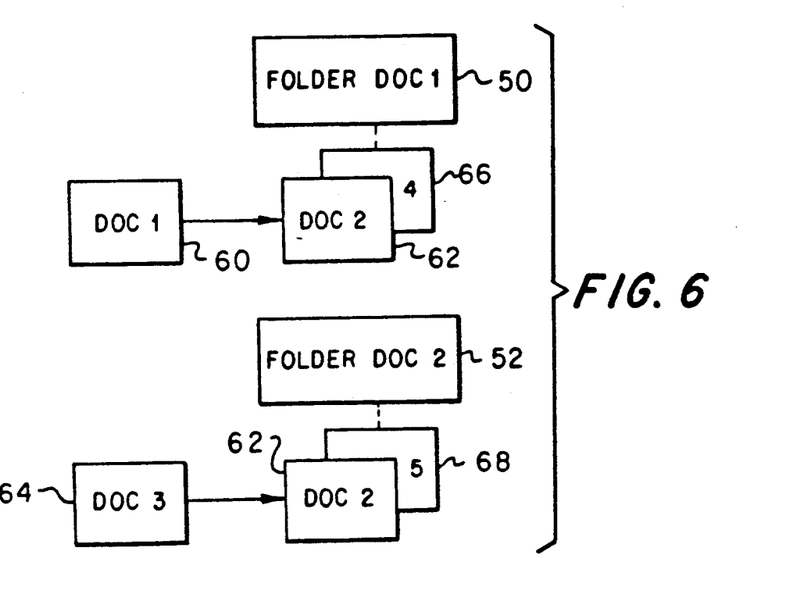
FIG. 6 is a block diagram illustrating stapled documents within a folder.

Further examples of various combinations of staple and folder relationships are shown in FIG. 6. Document 1 60 and document 2 62 may be stapled together and placed in folder document 1 50 along with document 4 66. In the same manner, document 3 64 may be stapled to document 2 62 and placed in folder document 2 52. Also included in folder document 2 52 is document 5 68. Each document within the folder contains its own particular attributes such as language, document type, character type, character sets and other profile information which describes the characteristics of the document itself. In order to access documents within the folder, the Library Server has to read and decipher each document's profile to determine the attributes of all documents within the relationship. For example, if all documents in the relationship were composed in French, each document would have profile information specifying that the document was in French.

Figure 7:
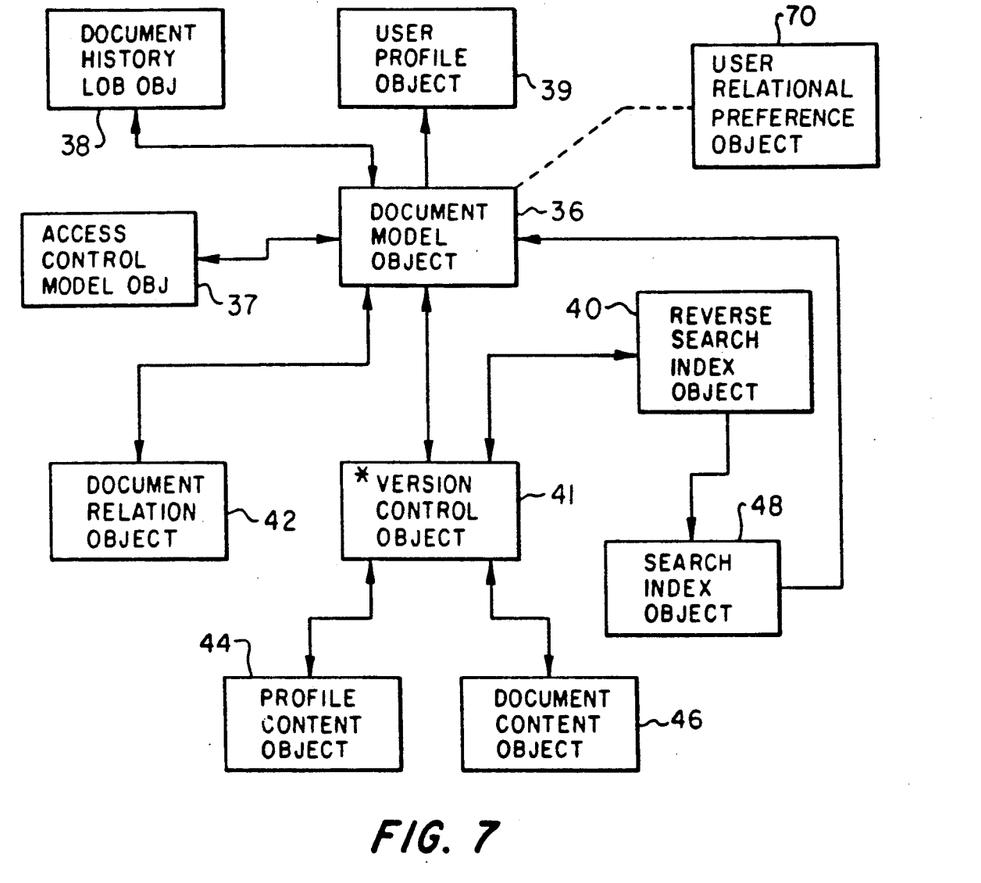
FIG. 7 shows the basic document model of FIG. 2 with the addition of the User Relational Preference Object in accordance with the method and apparatus of the present invention.

With reference now to FIG. 7, the basic document model of FIG. 2, for DIA Document Library Services is shown with the User Relational Preference Object 70 of the present invention added. User Relational Preference Object 70 contains fields which may be utilized to determine a user's preference with regard to permissible manipulation of an individual document within a multi-document relationship which is identified specifically or identified by those attributes which the document includes. User Relational Preference Object 70 preferable contains fields which may be utilized to identify a user's preferences with regard to all documents within the multi-document relationship containing a selected attributes or a user's preferences with regard to a listed number of documents.

Figure 8:
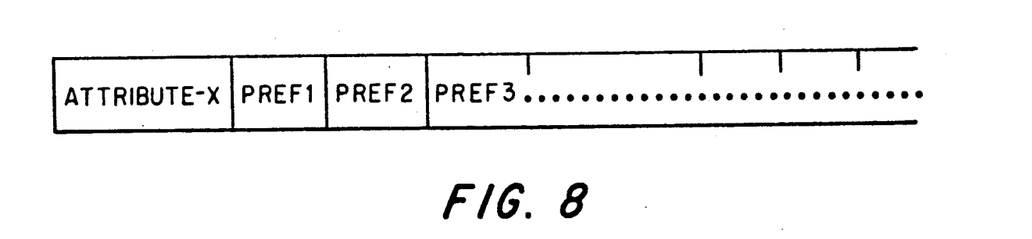
FIG. 8 is a pictorial representation of an attribute specifier in a User Relational Preference Object constructed in accordance with the method of the present invention.

Referring now to FIG. 8, there is depicted a pictorial representation of an attribute specifier in a User Relational Preference Object which is constructed in accordance with the method of the present invention. As illustrated in FIG. 8, the attribute specifier within a User Relational Preference Object indicates that a user has specified preferences 1, 2, and 3 for all documents within the working set of a multi-document relationship which contains the attribute "X." For example, attribute X may specify the type attribute of an encrypted document and preference 1 may specify that a user prefers no conversion. Preference 2 could identify a user's preference for no automatic forwarding of a distribution. Thus, for the field of the User Relational Preference Object illustrated with FIG. 8, a user's preferences for all documents within a multi-document relationship which has specified attributes may be efficiently determined by reference to the field of a User Relational Preference Object illustrated within FIG. 8.

Figure 9:
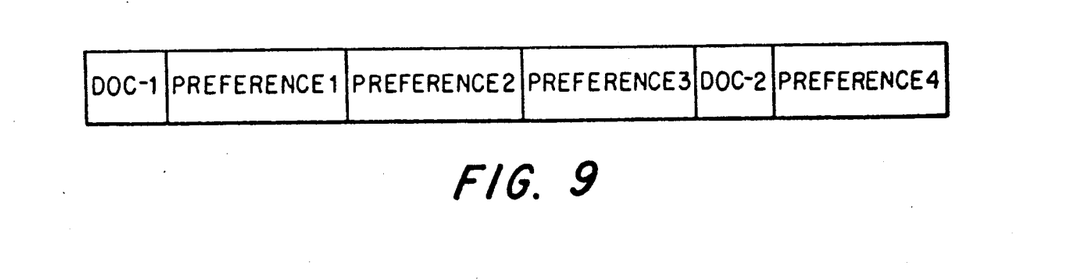
FIG. 9 is a pictorial representation of an object specifier in a User Relational Preference Object constructed in accordance with the method of the present invention.

Alternately, preferences may be listed within a User Relational Preference Object by explicitly identifying a particular document within a multi-document relationship. With reference to FIG. 9, there is depicted a pictorial representation of an object specifier which may be utilized in a User Relational Preference Object which is constructed in accordance with the method of the present invention. As illustrated in FIG. 9, this field identifies the fact that a user has specified preference 1, preference 2 and preference 3 for document 1 within a multi-document relationship and preference 4 for document 2 within that multi-document relationship. Thus, upon referecnce to FIGS. 8 and 9, those skilled in the art will appreciate that a User Relational Preference Object may be created in accordance with the method of the present invention which specifies a user's desired preferences with regard to manipulations of a selected Document within a group of document stored in a multi-document relationship by setting forth those preferences with regard to all documents containing a particular attribute or by specifying preferences for individual selected documents within the multi-document relationship.

Figure 10:
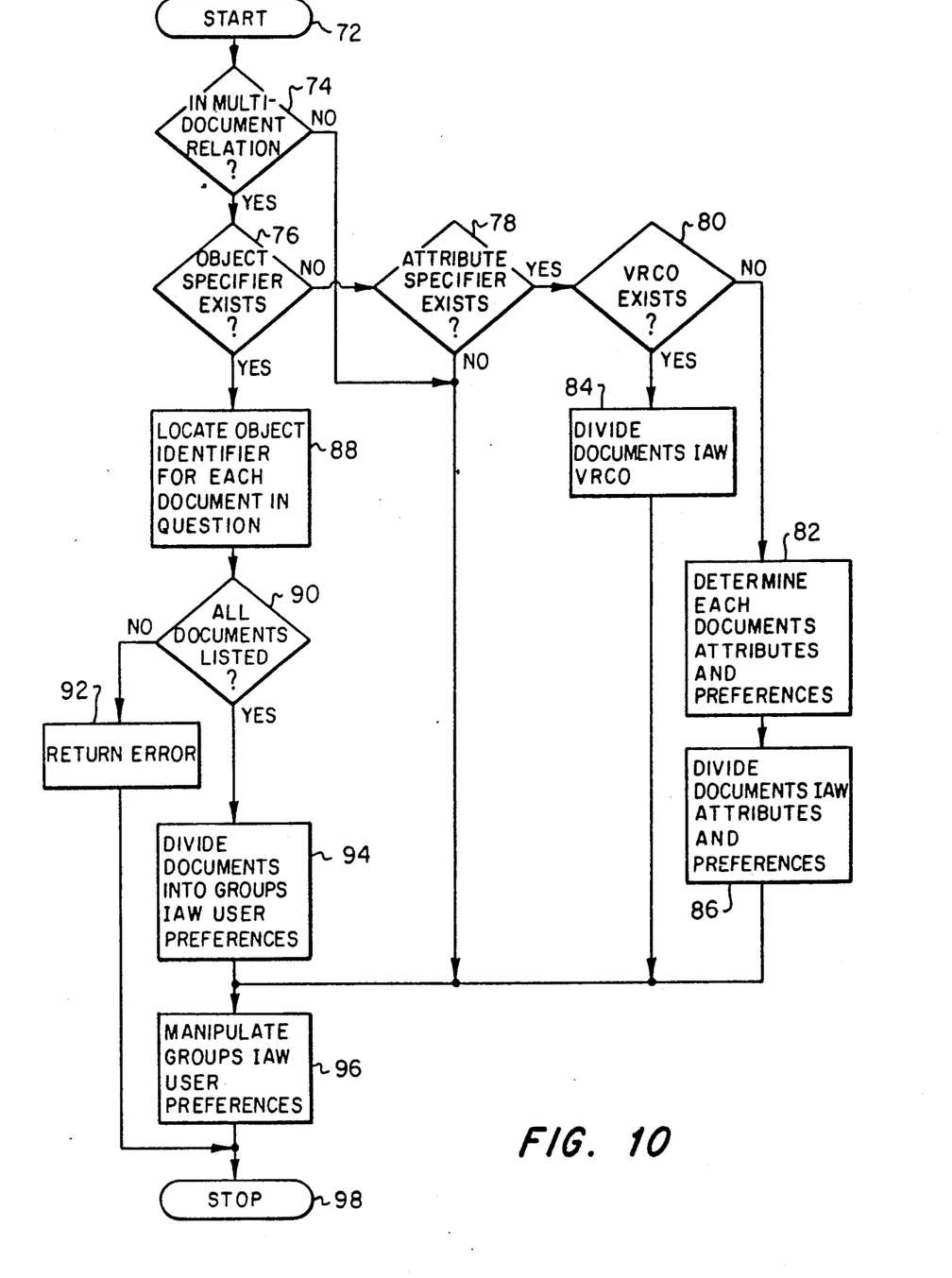
FIG. 10 is a logic flow chart illustrating the utilization of a User Relational Preference Object within a document interchange management system.

Finally, referring to FIG. 10, there is depicted a logic flow chart illustrating the utilization of a User Relational Preference Object within a document interchange management system. As illustrated, the process begins at block 72 which illustrates the initiation of an attempted manipulation of a document within a distributed data processing network. As referred to above, the term "manipulation" refers to any attempted distribution, transmittal, copying, purging, or other activities with regard to a selected document. Next, the process passes to block 74 which illustrates a determination of whether or not the document for which manipulation is attempted is part of a multi-document relationship. If not, the process passes to block 96 which depicts the processing of the document in accordance with the user preferences associated with that document.

Referring again to block 74, in the event the document which is to be manipulated is a part of a multi-document relationship, the process passes to block 76. Block 76 illustrates a determination of whether or not a unique object specifier, such as that illustrated in FIG. 9, exists. If so, the process passes to block 88 which illustrates the location of the object identifier for each document in question with in the multi-document relationship. Next, the process passes to block 90 which depicts a determination of whether or not all documents for which a manipulation is attempted are listed within the object identifier. If not, the process then passes to block 92 which returns an error message. Thereafter, the process terminates, as illustrated in block 98.

Referring again to block 90 in the event all documents for which manipulation is attempted are listed within the object identifier the process passes to block 94 which depicts the dividing of the documents into groups in accordance with the user preferences set forth within the object specifier for those documents. That is, all documents which include user preferences which limit manipulation of those documents to specific actions are grouped together for common processing.

Thereafter, block 96 illustrates the manipulation of these groups of documents in accordance with the user preferences. In this manner, a large group of documents which are stored together in a multi-document relationship may be divided into subgroups and manipulated in accordance with user preferences which are set forth for individual documents or groups of documents. Referring again to block 90, in the event all documents for which manipulation is attempted are not listed within the object specifier, those skilled in the art will appreciate that manipulation of those documents may be accomplished in accordance with user preferences set forth for the entire multi-document relationship in addition to returning an error message as illustrated in FIG. 10.

Referring again to block 74, in the event a manipulation is attempted of a document which does not exist in a multi-document relationship, the process then passes directly to block 96 for manipulation in accordance with the user preferences set forth for that individual document. Referring again to block 76, in the event an object specifier setting forth a particular group of documents for which stated preferences are listed does not exist, the process passes to block 78. Block 78 illustrates the determination of whether or not an attribute specifier such as that depicted within FIG. 8 exists. If not, the process then passes to block 96 wherein the attempted manipulation of the document will take place in accordance with the user preference set forth for the entire multi-document relationship, in a manner known in the prior art.

In the event an attribute specifier, such as that depicted within FIG. 8, does exist, as determined in block 78, the process passes to block 80. Block 80 illustrates a determination of whether or not a Vector Relational Characteristical Object (VRCO) exists for the working set of documents within the multi-document relationship. As set forth in the co-pending patent application referenced above, a Vector Relational Characteristical Object (VRCO) may be utilized to rapidly and efficiently identify groups of documents within multi-document relationships which include particular attributes. In the event a Vector Relational Characteristical Object (VRCO) does exist, the process passes to block 84 which illustrates the dividing of the documents within the working set of the multi-document relationship into groups in accordance with the information contained within the Vector Relational Characteristical Object (VRCO). That is, in accordance with the attributes associated with those documents. Thereafter, the process again passes to block 96 which illustrates the manipulation of these groups of documents in accordance with the user preferences associated therewith.

Referring again to block 80, in the event a Vector Relational Characteristical Object (VRCO) does not exist, the process passes to block 82. Block 82 illustrates a determination of each document's attributes and preferences on an individual basis. Thereafter, the process passes to block 86 which illustrates the dividing of the documents in accordance with document attributes and preferences which are determined individually. Again, the process then passes to block 96 which illustrates the manipulation of the groups of documents in accordance with the user preferences and attributes determined above.

Upon reference to the foregoing, those skilled in the art will appreciate that the inventors herein have provided a novel and unobvious method and apparatus whereby groups of documents which exist within a multi-document relationship may be manipulated by processing or distribution in accordance with sets of user preferences which are associated with individual documents within the multi-document relationship rather than in accordance with a set of user preferences set forth for the entire working set. In this manner, distribution and manipulation of documents in a multi-document relationship may be much more efficiently accomplished.

While the invention has been particularly shown and described with reference to a preferred embodiment, it will be understood by those skilled in the art that various changes in form and detail may be made therein without departing from the spirit and scope of the invention.

We claim:

1. A method in a data processing system for limiting permissible manipulations of a selected document within a multi-document relationship, said method comprising the steps of:
   identifying at least one preference of a user with respect to manipulation of a selected document within a multi-document relationship;
   creating a user preference object containing said at least one preference of a user associated with an identification of said selected document; and
   limiting manipulation of said selected document in accordance with said at least one preference of a user contained within said user preference object in response to an attempted manipulation of said selected document.

2. The method in a data processing system for limiting permissible manipulations of a selected document within a multi-document relationship according to claim 1, wherein said step of identifying at least one preference of a user with respect to manipulation of a selected document within a multi-document relationship comprises the step of identifying at least one preference of a user with respect to manipulation of a plurality of documents, each containing a selected attribute.

3. The method in a data processing system for limiting permissible manipulations of a selected document within a multi-document relationship according to claim 2, wherein said step of creating a user preference object containing said at least one preference of a user associated with an identification of said selected document comprises the step of creating a user preference object containing said at least one preference of a user associated with an identification of said selected attribute.

4. The method in a data processing system for limiting permissible manipulations of a selected document within a multi-document relationship according to claim 1, wherein said user preference object is stored in association with said selected document.

5. The method in a data processing system for limiting permissible manipulations of a selected document within a multi-document relationship according to claim 1, further including the step of determining if a user preference object exists in response to an attempted manipulation of a selected document.

6. A data processing system for limiting manipulation of a selected document within a multi-document relationship within said data processing system, said data processing system comprising:
   a user preference object stored within said data processing system including at least one user preference with respect to manipulation of a selected document;

means for accessing said user preference object in response to an attempted manipulation of said selected document; and control means for limiting manipulation of said selected document in accordance with said at least one user preference stored within said user preference object in response to an attempted manipulation of said selected document.

7. The data processing system for limiting manipulation of a selected document within a multi-document relationship within said data processing system according to claim 6, wherein said user preference object stored within said data processing system includes a user preference limiting manipulation of a plurality of documents all having a selected attribute.

* * * * *